(12) United States Patent
Klöpper

(10) Patent No.: US 10,539,479 B2
(45) Date of Patent: Jan. 21, 2020

(54) GRAVITY PENDULUM, ADAPTER AND HOLDER

(71) Applicant: Resonic GmbH, Berlin (DE)

(72) Inventor: Robert Klöpper, Berlin (DE)

(73) Assignee: Resonic GmbH, Berlin (DE)

( * ) Notice: Subject to any disclaimer, the term of this patent is extended or adjusted under 35 U.S.C. 154(b) by 351 days.

(21) Appl. No.: 14/891,043

(22) PCT Filed: May 13, 2014

(86) PCT No.: PCT/EP2014/059790
§ 371 (c)(1),
(2) Date: Nov. 13, 2015

(87) PCT Pub. No.: WO2014/184204
PCT Pub. Date: Nov. 20, 2014

(65) Prior Publication Data
US 2016/0116362 A1 Apr. 28, 2016

(30) Foreign Application Priority Data
May 14, 2013 (DE) .................. 10 2013 208 863

(51) Int. Cl.
*G01M 1/10* (2006.01)
*G01M 1/12* (2006.01)

(52) U.S. Cl.
CPC .............. *G01M 1/10* (2013.01); *G01M 1/122* (2013.01)

(58) Field of Classification Search
CPC ................. G01M 1/10; G01M 1/122
USPC ......... 73/65.01, 65.07; 33/366.24, 391, 398; 701/124; 702/169
See application file for complete search history.

(56) References Cited

U.S. PATENT DOCUMENTS

| 5,038,604 A | 8/1991 | Rollet |
| 5,309,753 A | 5/1994 | Johnson |
| 5,528,927 A | 6/1996 | Butler et al. |
| 2011/0219893 A1* | 9/2011 | Fiala .................. B64G 1/285 74/5.34 |
| 2016/0375948 A1* | 12/2016 | Takenaka .............. B62K 5/10 280/5.506 |

FOREIGN PATENT DOCUMENTS

| DE | 1903189 A1 | 10/1969 |
| DE | 3806395 A1 | 2/1989 |
| DE | 8909422 U2 | 9/1989 |
| DE | 4133376 A1 | 5/1992 |
| DE | 29622132 U1 | 3/1998 |

(Continued)

OTHER PUBLICATIONS

English Translation of DE 4133376 A1 description, Date of DE 4133376 A1: May 7, 1992, Publisher: Espacenet (EPO), pp. 5.*

(Continued)

*Primary Examiner* — Andre J Allen
(74) *Attorney, Agent, or Firm* — Schwegman Lundberg & Woessner, P.A.

(57) ABSTRACT

The invention relates to an adapter for a gravity pendulum, which adapter comprises a support for fastening a gravity body to be measured and at least two seat parts arranged at the support. The at least two seat parts comprise ellipsoid caps which can be held on a holder or on seating faces of a holder and are used to oscillate the adapter.

13 Claims, 10 Drawing Sheets

(56) References Cited

FOREIGN PATENT DOCUMENTS

| DE | 102013208863 A1 | 11/2014 |
| EP | 0303532 A1 | 2/1989 |
| FR | 1380683 A | 12/1964 |
| JP | H06265433 A | 9/1994 |
| JP | 2011053206 A | 3/2011 |
| WO | WO-2003/102528 A1 | 12/2003 |
| WO | WO-2014/184204 A2 | 11/2014 |

OTHER PUBLICATIONS

Authors: Harald C. Jensen, and John R. Monahan, Title: Air Bearing Support for a Pendulum, Date: 1968, Publisher: American Association of Physics Teachers, Publication: American Journal of Physics 36. pp. 459-460.*

Authors: J. H. McMillen, L. F. Stutzman and J. E. Hedrick, Title: A Pendulum Method for Measuring Settling Velocities, Date: Jul. 15, 1941, Publication: Industrial and Engineering Chemistry, vol. 13, No. 7, pp. 475-478.*

Authors: John W. Then, and Kang-rong Chiang, Title: Experimental Determination of Moments of Inertia by the Bifilar Pendulum Method, Date: 1970, Publisher: American Association of Physics Teachers, Publication: American Journal of Physics 38, 537-539.*

"International Application No. PCT/Ep2014/059790, International Preliminary Report on Patentability (English Translation) dated Nov. 26, 2015", 13 pgs.

Buyanov, E. V., "A Device for Measuring the Intertia Tensor of a Rigid Body", *Measurement Techniques*, vol. 34, No. 6, (1991), 585-589.

"International Application No. PCT/EP2014/059790, International Search Report and Written Opinion dated Nov. 18, 2014", (Nov. 18, 2014), 18 pgs.

\* cited by examiner

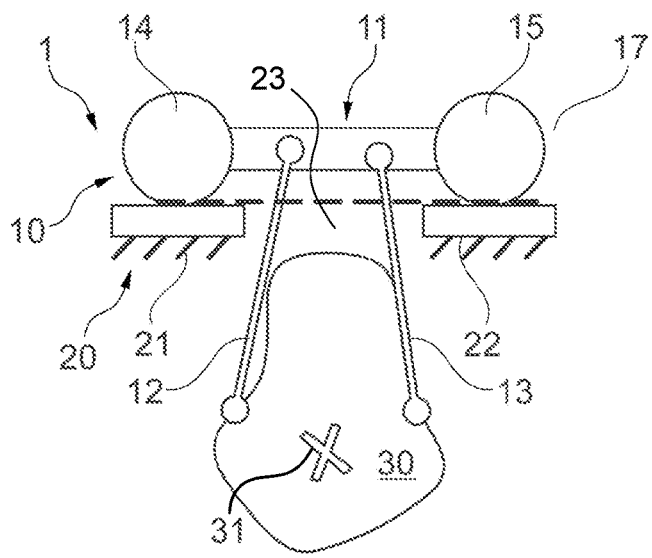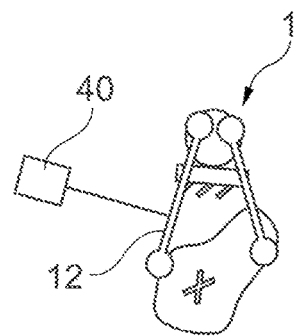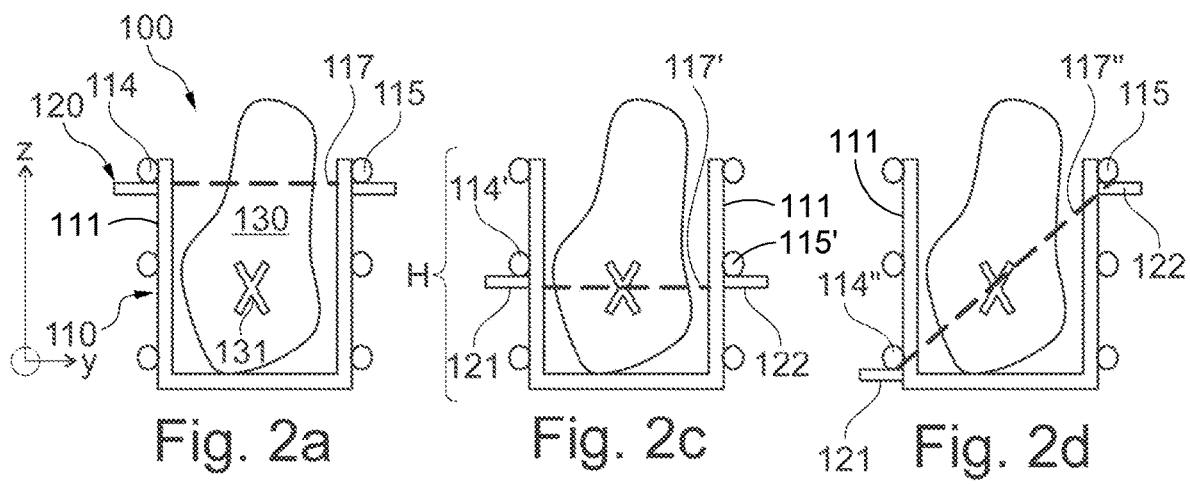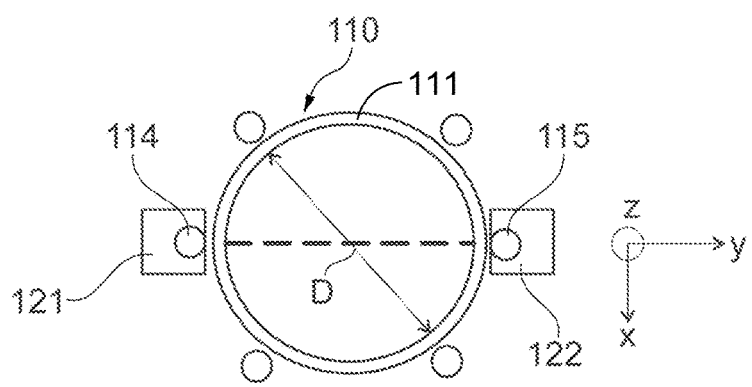

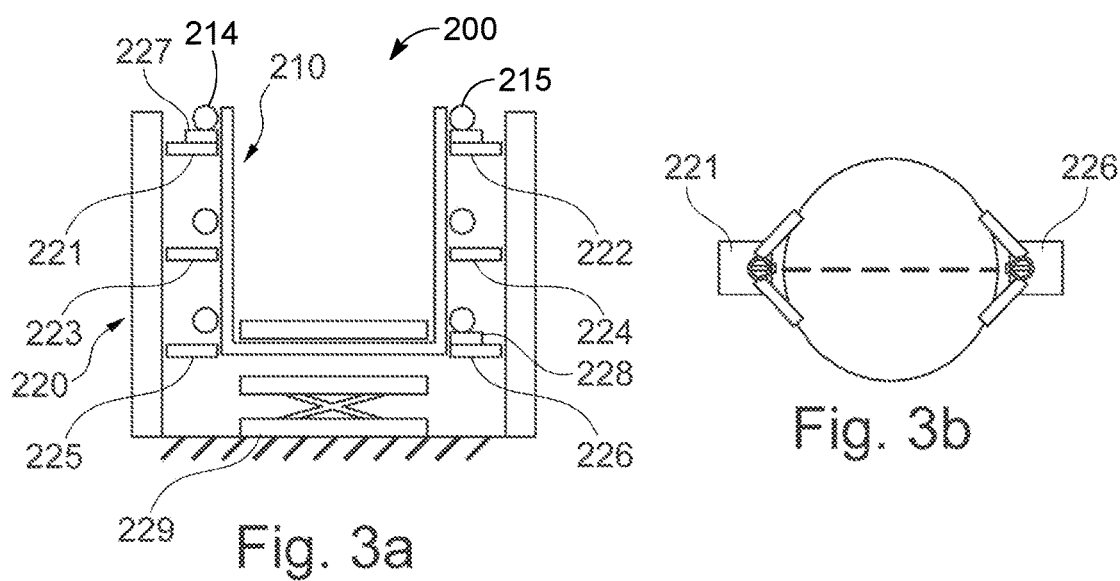
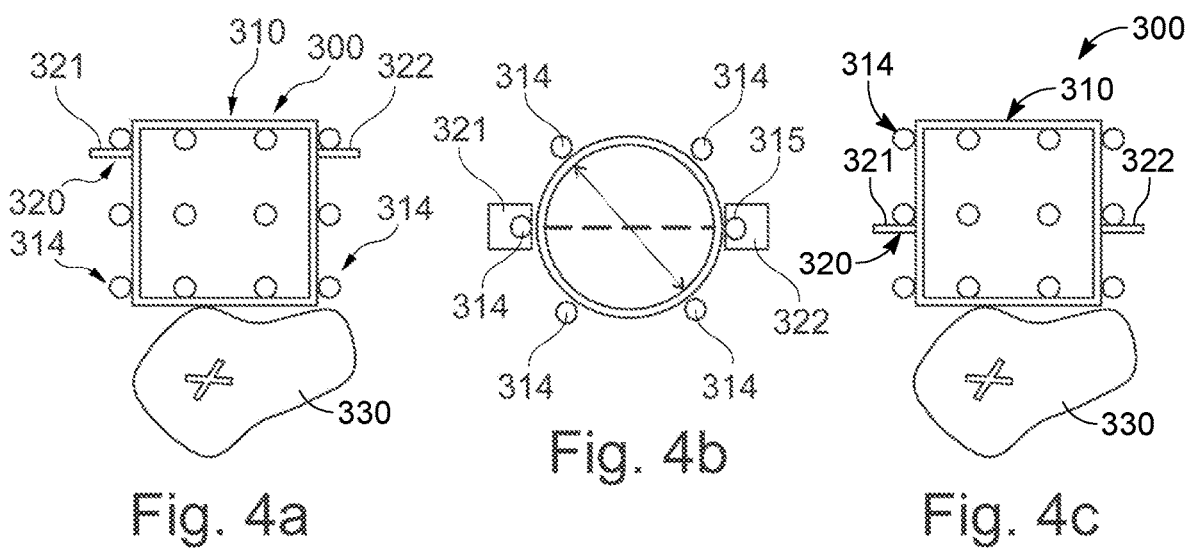
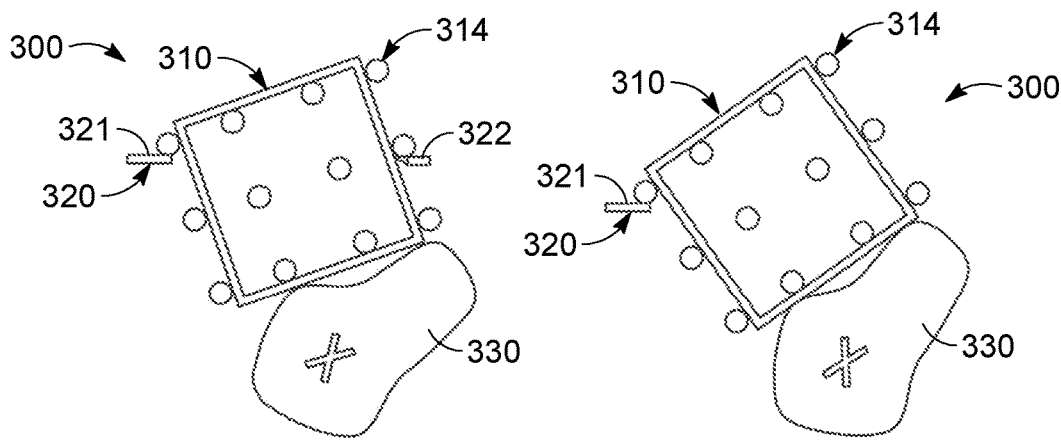

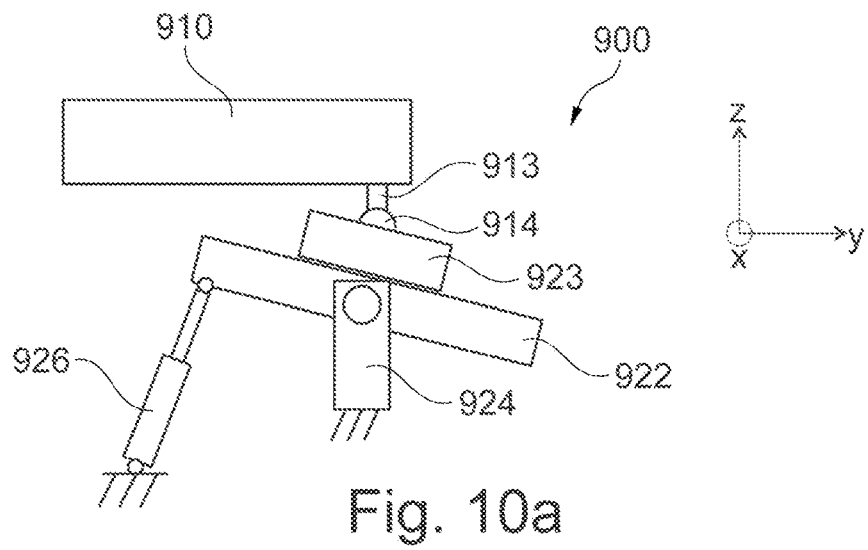
Fig. 10a
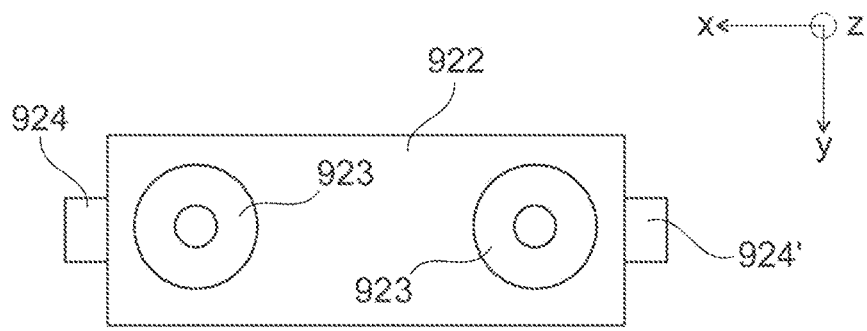
Fig. 10b
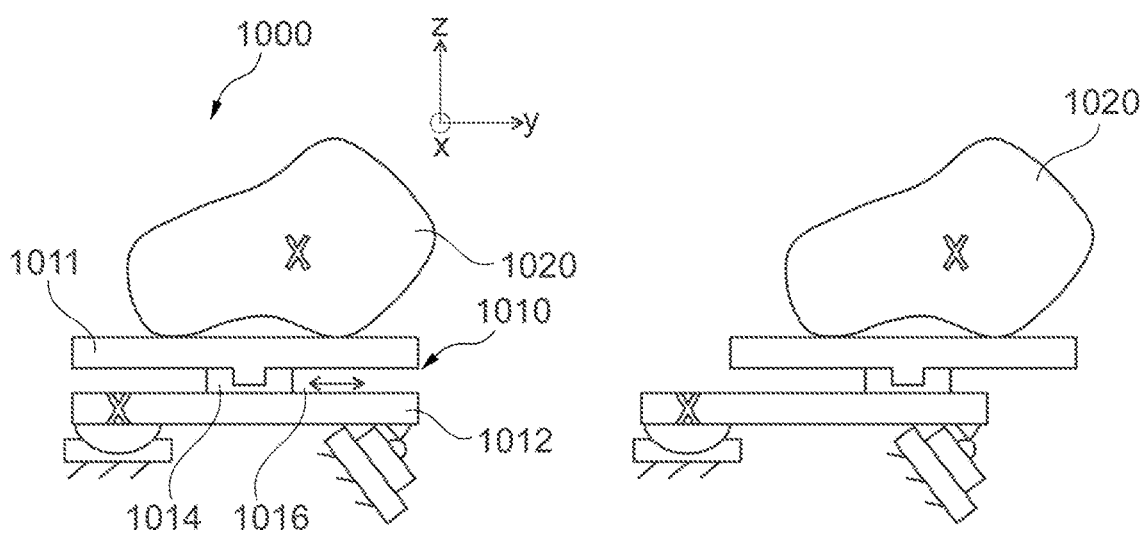
Fig. 11a
Fig. 11b

GRAVITY PENDULUM, ADAPTER AND HOLDER

PRIORITY CLAIM TO RELATED APPLICATIONS

This application is a U.S. national stage application filed under 35 U.S.C. § 371 from International Application Serial No. PCT/EP2014/059790, which was filed 13 May 2014, and published as WO2014/184204 on 20 Nov. 2014, and which claims priority to Germany Application No. 10 2013 208 863.9, filed 14 May 2013, which applications and publication are incorporated by reference as if reproduced herein and made a part hereof in their entirety, and the benefit of priority of each of which is claimed herein.

TECHNICAL FIELD

The subject-matter of the present invention is an adapter for a gravity pendulum, in different embodiments, a gravity pendulum holder for an adapter, as well as a gravity pendulum system with a holder and with an adapter. A method for determining moments of inertia and the centre of gravity by way of a gravity pendulum system is also disclosed.

BACKGROUND OF THE INVENTION

Inertia measurements for determining the inertia characteristics of an object with a spatial mass distribution (in contrast to point masses) serve for the simulation or prediction of the dynamic behaviour of the object, such as e.g. a car. Information for example on the handling behaviour of a car can be provided for example by way of determining the inertia characteristics such as centre of gravity and as well as the moments (moment of inertia and/or moment of deviation) of the inertia tensor. Numerous industrial applications for determining the inertia characteristics are known from the state of the art.

One of the methods for determining the moments of the inertia tensor or of the centre of gravity and known from the state of the art is a so-called gravity pendulum method. Thereby, the object to be measured or the gravity body to be measured is pendulated along nine or more different axes, wherein the inertia characteristics of the object arranged on the pendulum can be determined by way of measuring the natural frequencies of the pendulum oscillation. One of the standard methods is the fastening of the body to be measured on a carrier which is provided with blade bearings, wherein the blade bearings are suspended on two bearing holders and thus form a horizontal pendulum axis. The blade bearings lie on their blade tips along a line. The inertia tensor is determined bit by bit by way of fastening the body on the carrier in different spatial orientations.

A further variant of a method of the state of the art permits an object carrier to be suspended at different points, so that the body which is to be measured and which is fastened on the carrier is pendulated on two axes which are different but are parallel to one another. At least one moment of inertia and one centre of gravity coordinate of the object can be determined by way of this, given the same orientation of the body to be measured, on the pendulum.

A further method is known from U.S. Pat. No. 5,309,753. Here too, blade bearings are used, and the object is measured by way of arrangement on different adapters. Although numerous further methods are known in the state of the art, common to many methods is the fact that the changing of the pendulum axes requires much effort and/or demands complicated mechanisms or a completed re-fixing by hand DE 20 62 2132 U1 is referred to inasmuch as this is concerned.

SUMMARY

It is therefore the object of the present invention, to provide devices which simplify the evaluation of inertia characteristics.

In a first aspect of the invention, it is the case of an adapter for a gravity pendulum, wherein the adapter comprises a carrier for fastening a gravity body to be measured, and at least two, preferably three, particularly preferably more than three contact bodies arranged on the carrier.

In one variant, the at least two contact bodies are designed in a manner such that the adapter can be arranged on a pendulum holder in at least two different orientations, wherein the contact surface is essentially preferably the same in the at least two different orientations.

The contact surface of the pendulum axis is prevented from being changed under two different spatial orientations, i.e. the different rotation axes or pendulum axes, due to the fact that the adapter can be held on a holder for the adapter for a gravity pendulum, along two pendulum axis which do not run parallel to one another.

Two different embodiment variants for the contact bodies are essentially conceivable. In a first embodiment variant, the contact bodies comprise a pointedly tapering polyhedron section or cone section, wherein a tip of the polyhedron section or cone section forms a contact point of the contact body. In this embodiment variant, the adapter pendulates merely on two tips of the polyhedron section of the contact body. This variant has the advantage of a very low contact surface which also undergoes no change for example given an inclination of the adapter. However, the surface pressing on the contact surface in this variant is very high, so that damage to the contact body or to the contact surfaces can occur comparably rapidly.

In a further embodiment variant, the at least two contact bodies comprise ellipsoidal caps and preferably the special case of the spherical caps as ellipsoidal caps. With ellipsoidal or spherical caps, in particular with ellipsoidal caps which for the at least two contact bodies have the same radii of curvature, the design of the contact bodies leads to these also theoretically contacting at only one point. However, the ellipsoidal or spherical geometry is advantageous, since with this, the surface pressing is kept low and the symmetry of the ellipsoid or sphere has the effect that these essentially come to lie on a contact surface with the same area, even under different spatial orientations of the adapter. One advantage of spherical caps is a constant surface pressing which acts independently of the orientation of the spherical cap on a contact surface. This effect is already to be observed with ellipsoidal caps, wherein the surface pressing is then not completely independent of the orientation. A further advantage of the ellipsoidal or spherical caps is the simple manufacture and good availability. An alignment of the bearings as is the case with blade bearings is not necessary, so that the manufacture of the adapter is simplified. In contrast to blade bearings, the ellipsoidal caps or spherical caps have the further advantage that a spherical cap can be pendulated about several axes and in this manner one does not need to provide a multitude of differently orientated contact surfaces. The contact surfaces can be aligned horizontally in each case and be arranged at different heights.

A further aspect of the invention is an adapter for a gravity pendulum, wherein the adapter comprises a carrier for fastening a gravity body to be measured, and at least two contact bodies arranged on the carrier, wherein the at least two contact bodies comprise receiving devices for receiving ellipsoidal caps. With this aspect, the contact surfaces of a holder can for example comprise ellipsoidal or spherical caps, on which the adapter is mounted. This case is analogous to the case, in which the adapter comprises ellipsoidal-cap-shaped contact bodies, i.e. in which the adapter lies on a contact surface with a comparable surface in the case of different orientations of this adapter.

A further aspect of the invention relates to a gravity pendulum holder for an adapter, as is described in the first two aspects, wherein the gravity pendulum holder comprises a holding carrier and at least two contact surfaces, wherein either a wedge-like recess is present between the two contact surfaces, or the contact surfaces are arranged or can be arranged to one another, such that the distance of the contact surfaces to one another preferably constantly changes in one spatial direction.

The effect of this is that the differently shortest connection lines between the contact surfaces can be set by way of adjusting the contact surfaces in space. If the contact bodies of the adapter have a different distance to one another in the different orientations (i.e. the different pendulum axes), then contact points which permit a free oscillation of the adapter (preferably with the object fastened thereon) between the contact surfaces can be identified on the contact surfaces. The connection lines correspond essentially to the later pendulum axes, about which the object fastened on an adapter pendulates, in order to determine the moments of inertia of the object.

A further aspect of the invention concerns a holder and adapter, wherein the holder comprises a holding carrier and at least two contact surfaces, and the adapter comprises at least one carrier for fastening a gravity body to be measured and at least two contact bodies arranged on the carrier, wherein the contact surfaces or the contact bodies are designed in a manner such that in one variant, in each case one contact surface and the contact body corresponding to this contact one another in a "pointwise" manner (on the contact surfaces or contact bodies in the case of a polyhedron). Analogously to the first three aspects of this application, either the contact body or the contact surface can have an ellipsoidal cap, alternatively to the pointwise contact. Hereby, it is advantageous if all contact surfaces or all contact bodies have identical ellipsoidal caps. In an embodiment, the spherical cap or ellipsoidal cap is thereby designed in a manner such that this comprises more than half of an analogous spherical volume or ellipsoidal volume with the same axis lengths. This simplifies the handling of the adapter with a holder. Preferably, the spherical cap or ellipsoidal cap comprises more than 60%, more than 70%, more than 80% or more than 90% of the analogous sphere volume or ellipsoid volume. It is to be noted at this point, that spherical discs can also be subsumed under the term spherical cap, which is to say that the contact body at a side which is away from the carrier can likewise be blunt. Thereby, the two boundary surfaces of the spherical disc, between which the sphere surface runs, do not need to be parallel to one another, but this can be the case. The volume ratio to the solid sphere which is described for the spherical cap is valid for the volume of the spherical disk (or analogously to this, of the ellipsoidal disc). The sphere ring which only has a lateral surface of the spherical surface represents a particularity. In this context, the first aspect of the invention can also be understood to the extent that the contact body comprises a lateral surface which corresponds to a section of a lateral surface of an ellipsoid or of a sphere. Thus spherical caps in the context of the present applications form a subset of ball studs according to DIN 71803, but can also be designed in a manner such that these do not fall under this standard.

A further aspect of the invention relates to a gravity pendulum with a holder and an adapter which comprises at least one carrier for fastening a gravity body to be measured, wherein the holder is connected to the adapter in a manner such that the adapter can be pendulated about a pendulum axis. With this aspect of the invention, the adapter is designed in a manner such that the adapter can be pendulated about at least one pendulum axis which does not run horizontally and does not run vertically.

A further aspect to the invention concerns a method for determining a moment of inertia by way of a gravity pendulum with a holder and with an adapter which comprises at least one carrier and at least two contact bodies, where the adapter is successively pendulated between at least two pendulum axes which do not run parallel to one another. Thereby, adapters or holders according to the mentioned aspects of the applications are preferably applied. This method amongst other things includes a first variant, with which the contact surfaces of the arrangement are movable, so that these can be set to different heights. A variant, with which the adapter comprises more than two contact bodies, so that the adapter is movable about different pendulum axes by way of moving this, is also included. Both variants can be combined with one another.

Various further developments and embodiments of the different aspects are dealt with hereinafter.

In an embodiment of the first aspect, the adapter comprises at least three contact bodies which are arranged in a manner such that these do not lie on a straight line. One can already set at least two pendulum axes which do not run parallel to one another by way of reapplying the contact bodies onto the contacts surfaces, due to the fact that the contact bodies do not lie on a straight line and the connection lines connecting the contact bodies can optionally cross one another. This simple displacement of the adapter in a suitable holder simplifies the method for determining the moment of inertia.

In a further embodiment of the first aspect, the carrier comprises a multitude of contact bodies. A multitude of different pendulum axes can be defined between two contact bodies in each case, due to the multitude of contact bodies which preferably do not lie on a straight line. The adapter preferably has more than three or five, preferably more that 10 or preferably more than 20 contact bodies. The number of contact bodies amongst other things is dependent on the size of the acting forces of the adapter and on the body to be measured. One can fall back on the Hertz formula for a sphere, in order to determine the surface pressing and thus the spherical cap radius or spherical disc radius, i.e.

$$p\_\max = (3*F*E^2/(2*\pi^3*(1-v^2)^2)*(2/d)^2)^{(1/3)},$$

wherein

E=modulus of elasticity of the material of the contact body

F=force acting upon the contact body d=diameter of the contact body v=Possion's ratio The reliable diameter of the sphere for the selected material of the contact body can now be determined in dependence on the maximal force acting upon a contact body, i.e. the weight of the adapter and of the object to be measured. Thereby however, one should take into account the fact that the contact body in some embodiment examples includes a pin, wherein the pin effects a slight distancing of the spherical cap to the carrier and fixes the spherical cap on the carrier.

The number of contact bodies influences the number of possible suspensions or definable pendulum axes of the adapter in dependence on the number of available contact surfaces.

In a further embodiment of the first aspect, the carrier is designed in a rotationally symmetrical manner. The contact bodies for example can be arranged on the rotationally symmetrical carrier at a regular distance to one another, since the contact bodies are arranged on the carrier. A regular arrangement of the contact bodies results on the outer side of the carrier by way of this, wherein the adapter in a pointwise manner can be rotationally symmetrical (comparable to the symmetry with crystals) due to the rotational symmetry of the carrier. The handling of the adapter is simplified by way of this.

In a further embodiment of the first aspect, the carrier comprises a device for fixing the object to be measured. On fixing the object, this is held in a coordinate system of the carrier in a spatially fixed manner, so that the pendulation of the body about the different pendulum axes of the adapter permits the evaluation of the inertia characteristics. Dynamic effects which would need to be detected due to the relative movement of the object to the carrier can moreover be ignored.

In a further embodiment of the first aspect of the invention, the adapter is constructed in a manner such that this in one working configuration has no moving parts. With this embodiment, it is the case of a robust adapter which has no moving parts as soon as the adapter is inserted into the holder for measurement. For example, the contact bodies can be screwed, riveted or welded or soldered onto the body. Further connection techniques are known from the state of the art and are adequately known depending on the applied materials of the carrier and of the contact body. Metals, preferably hard metals such as hardened steels (e.g. ball bearing steel), hard plastics ceramics or diamond structures are considered as materials for the carrier or the contact bodies, so that an elastic deformation of the contact bodies or of the carrier can be neglected. The methods for determining the inertia characteristics are simplified by way of this. Whereas a material of greater hardness is preferred for the contact body, a high stiffness and preferably a reduced weight, i.e. also fibre composite materials or aluminium is preferred for the carrier. The materials of the contact body and of the carrier are different in numerous embodiments.

In an embodiment of the fourth aspect of the invention, the holder and the adapter are designed in a manner releasable from one another. Hereby, a rapid change of the pendulum axes of the adapter can be carried out by way of a simple lifting of the adapter and changing of the two contact points essentially determining the pendulum axis, particularly if the adapter has a multitude of contact bodies. A clamping-in of the adapter is not necessary. This is held on the holder merely by way of gravity.

In a further embodiment of the fourth aspect, the two contact surfaces are arranged or can be arranged at a different height relative to the holding carrier. Pendulum axes which also do not run horizontally can be measured by way of this for example. In other embodiments, the adapter has more than two contact bodies, so that the adapter almost does not have to be moved, if the contact surfaces are displaced in a manner such that at least one other contact body is used compared to the first measurement, so that the pendulum axis with a subsequent measurement is changed compared to the pendulum axis of the first measurement. The test object in this manner is hardly moved at all and is not changed in its orientation in this manner.

In a further embodiment of the fourth aspect, two contact surfaces lie opposite one another such that the adapter is held between the contact surfaces. In other words, a recess is present between the two contact surfaces, so that the adapter can oscillate between the contact surfaces.

In a further embodiment, spherical bearings are present between the contact surfaces or the contact bodies and these define the ellipsoidal-cap-shaped section. With regard to the ellipsoidal caps, it is preferably the case of spherical caps.

Further embodiments of the fifth aspect of the application are described hereinafter. The fifth aspect of the application, as already mentioned, relates to a gravity pendulum with a holder and an adapter which comprises at least one carrier for fastening a gravity body to be measured, wherein the holder is connected to the adapter in a manner such that the adapter can be pendulated about the pendulum axis. With this aspect of the invention, the adapter is designed in a manner such that the adapter can be pendulated about at least one non-horizontally and non-vertically running pendulum axis.

In an embodiment example of the fifth aspect, the gravity pendulum is designed in a manner such that an inclination of the pendulum axis is designed in an adjustable manner. Several measurements are necessary, in order to determine the different or all components of the inertia tensor of a test object. Hereby, it is advantageous if the test object or the object to be measured is pendulated along different axes of the test object. In an embodiment example, one envisages changing the inclination of the pendulum axis, for example by way of the holder, in which the adapter is mounted, being able to be adjusted in its inclination, since it is indeed heavy objects which should be moved as little as possible. Thereby, in one variant one can moreover envisage the pivot connected to the adapter being able to likewise be changed in its inclination with respect to the adapter. For this, the pivot for example can be rotated on the adapter with the help of a joint, in order thus to set different inclinations of the pivot and thus of the pendulum axis. The holder can moreover likewise be rotatably mounted, for example in a bearing block.

In a further embodiment example of the fifth aspect, the pendulum axis can be set in a manner such that a centre of gravity of an object to be measured lies below the pendulum axis. One speaks mostly of a gravity pendulum, if the centre of gravity of the object to be measured lies below the pendulum axis. Since with the fifth aspect of the application, the test object or the object to be measured is often arranged on top of the carrier of the adapter, in some embodiments one envisages providing an adjustability of the inclination of the pendulum axes in a manner such that particularly large test objects can also to be measured with the gravity pendulum. For this, one can for example envisage providing the inclination of the pendulum axis, considered from the horizontal, at an angular region of 80°, advantageously 90°. Test objects with a high centre of gravity can be measured with the help of the gravity pendulum in this manner.

In a further embodiment example of the fifth aspect, the adapter is connected the holder via a pivot, wherein the pivot is coaxial with the pendulum axis.

In a further variant, one envisages the adapter being connected to the holder via a spherical bearing for example, such as a spherical air bearing or a hydraulic spherical bearing for example, wherein the middle point of the sphere represents a point of the pendulum axis. With this variant, one can envisage either the spherical cap or the spherical socket being connected to the holder or to the adapter.

The spherical bearings for example have the advantage that these permit a particularly simper adjustment ability of the pendulum axis. With the application of a pivot which is connected to the holder, the pivot must be adjustable in its inclination with respect to the adapter, for the adjustability of the inclination of the pendulum axis. This is not necessary to the same extent with a spherical bearing.

In a further embodiment example, the gravity pendulum comprises at least one further bearing. Hereby, it is advantageous if at least one plane rotatable about a space axis, such as a sliding plate for example, in particular a plane sliding plate is present, along which the further bearing is supported. The further bearing is arranged on the lower side of the adapter. The plane which is rotatable about the spatial axis is thereby set such that this is perpendicular to the pendulum axis. In this manner, the plane supports the further bearing connected to the adapter, so that no or only a small torque acts upon the adapter or the object to be measured or the pivot. The load capacity and the robustness of the gravity pendulum are improved by way of this. If an adjustable pivot, a spherical or cylinder-surface-shaped bearing is envisaged as a pendulum axis, then the angle of the pendulum axis can be set via a rotation of the rotatable plane or of the sliding plate, since the pendulum axis must always be at a right angle to the plane, in order to permit a pendulum movement about the pendulum axis. In this manner, an adjustment of the pendulum axis can be achieved in a particularly simple manner by way of adjusting the angle of the plane, without moving the test object or the object to be measured, on the adapter.

Thereby, in a further embodiment, one envisages the sliding plate being changeable in its angular setting in a mechanical, hydraulic or pneumatic manner. Thus for example one can envisage arranging a hydraulic or pneumatic cylinder on the sliding plate, said cylinder changing the angular setting of the sliding plate. Thereby, it is advantageous if the sliding plate itself is rotatably mounted in a bearing block. Moreover, it is also possible to change the angular setting of the sliding plate by way of mechanics. Thereby, the mechanics can be operated by way of a motor for example.

With regard to the further bearings, it can be the case for example of a plane sliding bearing, in particular a plane air bearing, which is connected to the adapter via a ball joint. Alternatively, the further bearing can be realised for example by a ball which is rotatable on the adapter. The further bearings can also be indicated as support bearings, in order to differentiate then from pendulum bearings, through which the pendulum axis runs.

In a further embodiment, the carrier is designed in a rotatable manner with respect to the adapter. The carrier arranged on the adapter for example can be rotated with respect to the adapter, in order to permit an as simple as possible rotation of the test object on the adapter. Thus for example, the carrier can comprise a continuation or pin, which is arranged in the centre and which engages into a cylinder-shaped groove of the adapter. If a bearing, such as a ball bearing is arranged in this groove or on the pin, then the carrier can be rotated with respect to the adapter in a very simple way and manner. Moreover, one can envisage designing the rotation mechanism with a locking mechanism between the carrier and the adapter, in order to prevent a rotation during the measurement. The locking mechanism can be realised for example by way of locking pins which engages into grooves. However, further locking mechanisms known from the state of the art can also be applied.

In a further variant, the carrier is linearly displaceable with respect to the adapter. Thus for example the carrier can be led on the adapter in a rail, so that the position of the carrier on the adapter can also be changed transversely. The possibility of pendulating the test object about different axes is also results by way of this. The transversally displaceable carrier can thereby also be locked with respect to the adapter by way of a locking mechanism, so that a measurement can be executed without a movement of the carrier on the adapter.

In a further embodiment example, the gravity pendulum comprises a mount which can be arranged for example on the floor and on which the adapter can be pendulated. Thereby, the rotatable plane or a bearing shell of the pendulum bearing can be arranged on the mount depending on the applied variant of the gravity pendulum, and the adapter can comprise the further support bearings or the remaining components of the pendulum bearing which can be arranged in a freely oscillating manner on the sliding plates. The mount can thereby also have sensor systems, by way of which the oscillation frequencies of the free oscillation of the adapter with respect to the mount can be evaluated. Mirrors, distance sensors and further measures for evaluating the frequency spectrum and known from the state of the art are conceivable for this for example. Concerning this, the international application which has been filed on the same day and which claims the priority of DE 10 2013 208 863.9 is particularly referred to.

A gravity pendulum according to the fifth aspect of the invention can thus be applied such that the adapter can be successively pendulated about at least two pendulum axes which do not run parallel to one another, for determining at least one inertia moment and, in variants, also the centre of gravity of the adapter. Moreover, the adapter can also be successively pendulated about two pendulum axes running parallel to one another, inasmuch as the two pendulum axes do not form coaxial spatial axes of the test object.

BRIEF DESCRIPTION OF THE DRAWINGS

Further embodiment examples are explained by way of the subsequent figures. There are shown in FIGS. 1a and 1b a simple embodiment of an adapter and of a gravity pendulum system;

FIGS. 2a to 2d a schematic illustration of an adapter with several contact bodies for defining different pendulum axes;

FIGS. 3a and 3b further embodiments of a gravity pendulum system;

FIGS. 4a to 4e further variants of a gravity pendulum;

FIGS. 10a to 10b details of a possible variant of a sliding plate of the embodiment examples of FIGS. 7-9;

FIGS. 11a and 11b a further embodiment of a gravity pendulum with a pendulum axis which does not run horizontally.

DETAILED DESCRIPTION

Figure 5:
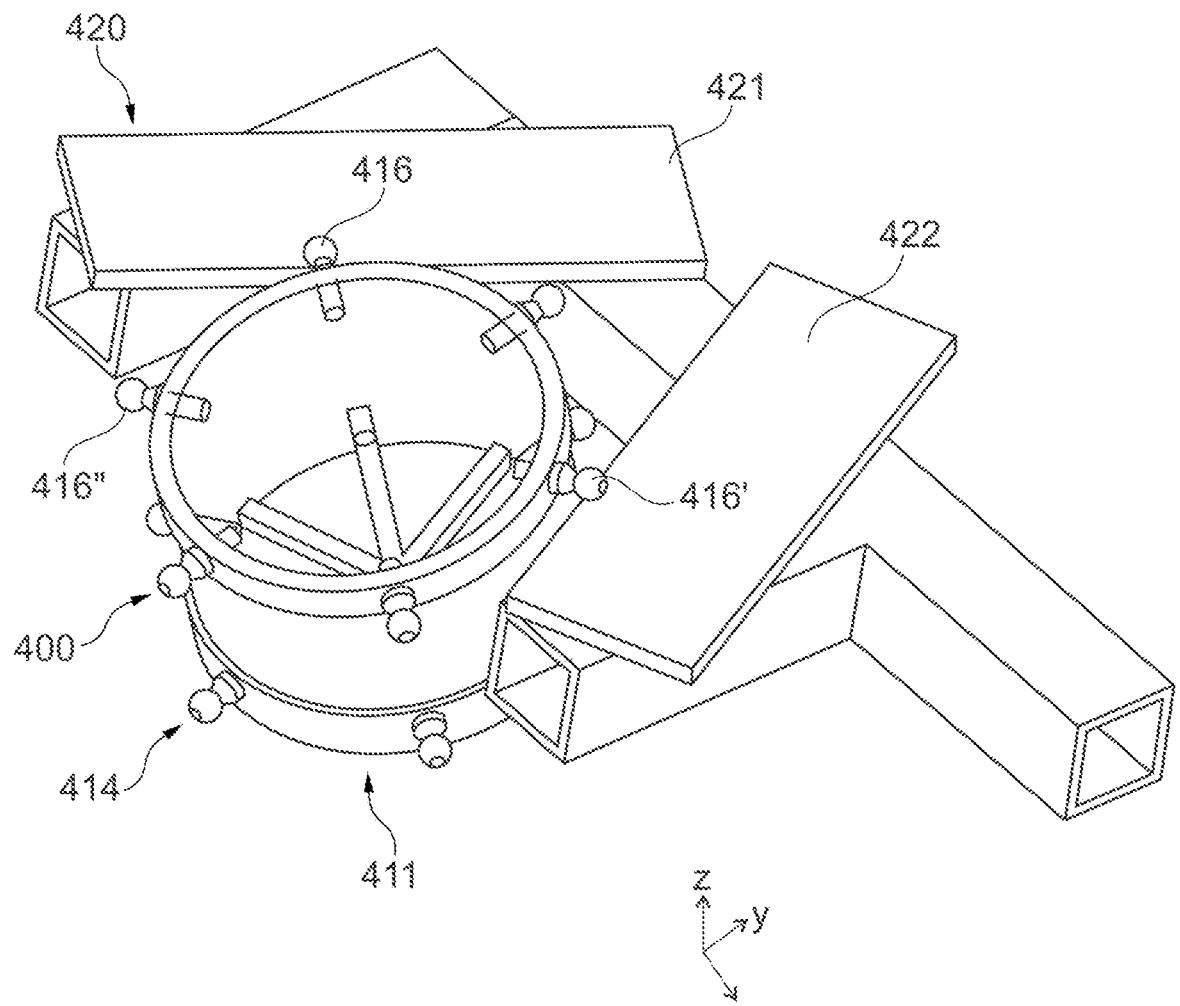
FIG. 5 an embodiment example of a gravity pendulum with pendulum holders with wedge-like contact surfaces.

A simple gravity pendulum system 1 is represented in FIG. 1. The gravity pendulum system 1 comprises an adapter 10 as well as a holder 20. Moments of inertia, moments of deviation as well as the centre of gravity 31 of the object 30 are able to be determined by way of the gravity pendulum system.

The adapter 10 comprises a carrier 11, on which two fixation rods 12 and 13 are located, at whose ends clamping pins are arranged, said clamping pins fixing the body 30 to be measured, with respect to the adapter 10 or with respect to the carrier 11. This means that the body 30 is not moved in a coordinate system with respect to the carrier 11, and changes of the orientation of the pendulum axis can be used for determining a further inertia parameter. Contact bodies 14 and 15 are arranged at the left and right edge of the carrier and in the present case are designed as spherical caps. The represented contact bodies are thereby spherical segments or spherical caps which assume a volume which is significantly greater than half the volume of the sphere with the same diameter. It is ensured that the contact surfaces between the contact bodies 14 and 15 are as small as possible in comparison to the contact surfaces 21 and 22 of the holder, by way of the design of the contact bodies 14 and 15 as spherical caps. The friction with a pendulating movement of the pendulum about the pendulum axis 17 is minimised by way of this.

With regard to the contact bodies, it is the case of spherical caps which have a diameter of less than 20 mm. It was ensured that the friction resistance is low, when considering the size of the spherical caps.

In the present example of FIG. 1a, the pendulum axis is designed in a horizontal manner. This is due to the fact that the contact surfaces 21 and 22 are arranged at the same height. A recess 23, in which the body 30 can pendulate or freely oscillate, is located between the contact surfaces 21 and 22. If the adapter 10 is now applied onto two further contact surfaces which do not have the same height, then the object 30 pendulates about a non-horizontal pendulum axis. The contact surface is essentially the same compared to the case of the horizontal pendulum axis, and problems which would occur with the application of blade bearings in different orientations are avoided, on account of the spherical cap shape of the contact bodies 14 and 15.

Mechanisms for detecting the pendulum data are to be briefly dealt with by way of FIG. 1b. A distance determining laser 40 which measures the distance of the fixation rod 12 to the laser per unit of time is directed onto a fixation rod 12 of the pendulum system 1. The frequency of the pendulum movement can be determined by way of determining this data. In turn, after the object 30 has been pendulated along different pendulum axes which do not run parallel to one another, the total inertia tensor is determined bit by bit from these and further measurements, as well as the centre of gravity with the help of an inclination senor, although the evaluation of the centre of gravity is also possible from the measurement of the natural frequencies and the amplitude of the oscillation. In the present example, the contact bodies 14 and 15 are manufactured of a hard material such as a hard steel for example and preferably have a uniform radius of curvature. The spherical caps however could also be designed as ellipsoidal caps or as cone section caps and the method would continue to be able to be carried out (even if with a few corrections due to the changing friction forces). However, due to the symmetry of the spherical caps, it is possible for the total surface pressing of the two contact bodies on the contact surfaces to be the same, irrespective of the orientation, in which the carrier is placed onto the two contact surfaces. This simplifies the handling of the pendulum system 1. Although one often speaks hereinafter of spherical caps, these also include spherical discs as mentioned in the previous sections. The spherical cap of the contact body 14 in this case would be flattened at its left edge. Moreover, the contact bodies apart from the spherical caps could yet comprise pins which are fastened on the carrier. These spherical caps with pins in the present embodiment example can be designed as ball studs according to DIN 71803.

A further gravity pendulum system is schematically represented in FIG. 2. The gravity pendulum 100 comprises an adapter 110 which is held on a holder 120. The adapter 110 comprises a carrier 111 which is designed in a cylinder-shape manner. The object 130 to be measured, with the centre of gravity 131 is arranged in the adapter 110 and is fixed in a manner such that it is spatially fixed with respect to the carrier's own coordinate system. The carrier's own coordinate system here can be defined by cylinder coordinates which run through a middle point of the cylinder-shaped carrier. Alternatives are likewise possible. Contact bodies 114 and 115 are arranged on the carrier 111 which in the present case can be manufactured of metal or plastic, and these contact bodies, as recognisable by way of FIGS. 2a and 2b, are arranged on different levels in the Z-direction and at regular distances along the periphery of the cylinder of the carrier in the XY plane. The contact bodies 114 or 115 are thereby arranged on the carrier 111 in a manner such that they lie opposite one another in each case. This means that they span the complete diameter D of the carrier 111. The contact bodies are designed in a small manner in relation to the diameter D of the carrier 111 and the height H of the carrier 111. In the present example, with regard to the contact bodies, it is the case of spherical caps which are arranged on metal pins. The pins can be connected to the spherical caps in an integral manner or non-positively or positively. The diameter of the spheres of the spherical caps is thereby essentially smaller than the height or the diameter of the carrier, by a factor of 10, preferably by more than a factor of 15.

As can be recognised by way of FIG. 2b, the holder 120 in the present embodiment example comprises only two contact surfaces 121 and 122. These are height-adjustable only along the Z-direction. In other embodiments, the contact surfaces can optionally also be displaced in the XY plane. The suspension condition of the adapter 110 which is represented in FIG. 2b corresponds to the case which is represented in FIGS. 2a and 2c. The pendulum axis 117 differs from the pendulum axis 117' represented in FIG. 2c. The adapter 110 merely needs to be lifted, in order to bring it into the position represented in FIG. 2c, so that the contact bodies 114' or 115' come to lie on the contact surfaces. The pendulum axis 117' is located significantly closer to the centre of gravity 131 than in the case represented in FIG. 2a. In this variant, the object to be measured however always remains in a uniform orientation (with a resting pendulum) over the measurement of the different pendulum axes, so that highly elastic objects which are easily damaged can also be measured by way of the device or can be carried out with this method. This variant is moreover suitable for comparatively heavy objects which cannot be rotated without further ado.

The contact surfaces 121 and 122 can be adjusted in their height in a manner such that the contact surfaces no longer lie at the same height, additionally to the pendulum axes which are represented in the FIGS. 2 and 2c. In the case which is represented in FIG. 2d, the contact body 114" lies on the contact surface 121, whereas the contact body 115 is located on the contact surface which is located at a different height. A pendulum axis 117" is defined by way of this, and this no longer runs horizontally, i.e. perpendicularly to the Z-direction, but at an angle to this. The complete measurement of the body for determining the compete inertia tensor or the centre of gravity and the mass can be carried out in a simple way and manner since a multitude of combinations of pendulum axes results due to the multitude of contact bodies.

The adapter 110 is thereby designed in a manner such that this can receive different objects. The adapter for example can assume a height of up to 100 cm, preferably less than 50 cm, and preferably less than 20 cm. The radius can likewise lie in this range of magnitude. It is possible to determine the inertia tensor in a very simple way and manner by way of this, for example with objects of a low mass and small dimension. The adapter in one embodiment is designed such that this can receive objects of up to 10 kg, up to 20 kg or up to 50 kg mass.

Ellipsoidal caps can also be replaced by tips of polyhedrons which point downwards in the Z-direction, although contact bodies with spherical or ellipsoidal caps are again represented in FIG. 2. These however are more difficult to manufacture and in particular have a high surface pressing, so that either the tips of the polyhedron or the contact surfaces could become damaged.

An alternative embodiment of a pendulum system is represented in FIG. 3. The pendulum system 200 comprises an adapter 210 as well as a holding device 220. The adapter 210 is thereby designed in a manner such that this comprises contact bodies 214 and 215 which lie opposite one another in a manner spanning the complete diameter of the adapter. A multitude of contact bodies are arranged on the carrier of the adapter 210, however these differ merely with regard to their height position, but not along their position on the outer surface of the adapter (see FIG. 3b). The adapter 210 can alternatively comprise a rotatable platform, so that the object to be measured can be rotated and thus the pendulum axis which runs between two equal contact bodies can determine different moments of the object. In this context, the pendulum axes of two measurements in the local coordinate system of the object are different. Of course, an adapter 110 as represented in FIG. 2 however can also be applied in the holder device 220, as long at the outer dimensions are such that a pendulating of the adapter between the contact surfaces of the holder is possible. The holding device 220 comprises a multitude of contact surfaces 221 to 226. The rest surfaces lie opposite one another and in pairs above one another in the Z-direction. The holding device additionally comprises spacer devices 227 as well as 228 which are pushed between the contact surface and the contact body of the adapter, in order to effect only two contact bodies being held by the holding device 220. A pendulum axis is defined in this manner and the characteristics of the body can be measured in a pendulating manner. The holding device moreover comprises a lifting device 229 which can slightly lift the adapter 210, in order to position the spacer elements 227 and 228 on different contact surfaces for different measurements. Numerous different pendulum axes can be defined by way of this within a short time, in order to thus fully determine the characteristics of the object to be measured.

A further embodiment of a gravity pendulum is to be explained by way of FIG. 4. The gravity pendulum system 300 comprises an adapter 310 which is designed analogously to the adapter 110 of FIG. 2, i.e. which at the outer side of the carrier 311 has a multitude of contact bodies 314, 315 and 316. The holder 320 merely comprises two contact surfaces 321 and 322, as is recognisable in FIG. 4b. One envisages not arranging the object 330 within the adapter, but fixing the object on the adapter 310 at the outside, as an alternative to the adapter 110. The fastening can thereby also be carried out with an adhesive tape or likewise. Whereas with the embodiment example of FIG. 2, the adapter was moved to a very small extent, but different pendulum axes were created due to the different settings of the contact surfaces, with the embodiment examples of FIG. 4 the adapter is spatially displaced. This can be recognised by way of different positions of the adapter in the FIGS. 4a, 4c, 4d, and 4e. It is evident that four different pendulum axes can be set in the different configurations of the FIGS. 4a, 4c, 4d and 4e.

A further alternative embodiment of a gravity pendulum which is very similar to the embodiment example of FIGS. 2 and 4 is represented in FIG. 5. The gravity pendulum system 400 comprises an adapter 410 with a multitude of identical contact bodies 414 which are designed in the manner of a spherical cap. The adapter 410 has no moving parts, thus can only be moved as a whole. The holder 420 comprises two contact surfaces 421 as well as 422 which are moved to one another along the X direction in its width, i.e. in the Y-direction. This has the advantage that if contact bodies which do not span the entire diameter of the carrier 411 are used, as is shown in the represented configuration, these however can be held on the contact surfaces despite this. Two selected contact bodies 416 and 416' lie on the rest surfaces 421 and 422 respectively, in the present example. If now the contact bodies 416' and the contact body 416" were to be selected, in order to form the next pendulum axis, then the adapter 410 would merely need to be lifted and placed upon the contact surfaces in a manner such that the adapter can oscillate between the contact surfaces. Other contacts points on the contact surfaces would be selected for this, since the distance of the contact bodies 416' and 416" is larger than the distance of the contact bodies 416 and 416'. All contact bodies are screwed, riveted, welded or bonded on the carrier. The only movement which the adapter carries out is the pendulum movement about the pendulum axis defined by the two contact bodies. Different combinations of two contact bodies can be used for defining the pendulum axis due to the symmetry of the contact bodies. The possibility of determining all moments of inertia and deviation within a few oscillation procedures with transitions which are simple to accomplish, i.e. by way of rehanging the adapter in the holding device, results by way of this. The centre of gravity can also be simultaneously geometrically determined for example if an inclination sensor is additionally arranged in the adapter 410. The number of measurements to be carried out is reduced to measurements about six different pendulum axes by way of this. With regard to the gravity pendulum represented in FIG. 5, it all concerns objects of metal. However, other wear-resistant materials are also possible. The spherical caps of the rest bodies 414 and 416 have a diameter of 16 mm. The adapter which is designed in a cylinder-shaped manner has a height of 10 cm in the Z-direction and a diameter of likewise 10 cm in the XY-plane.

Figure 6A:
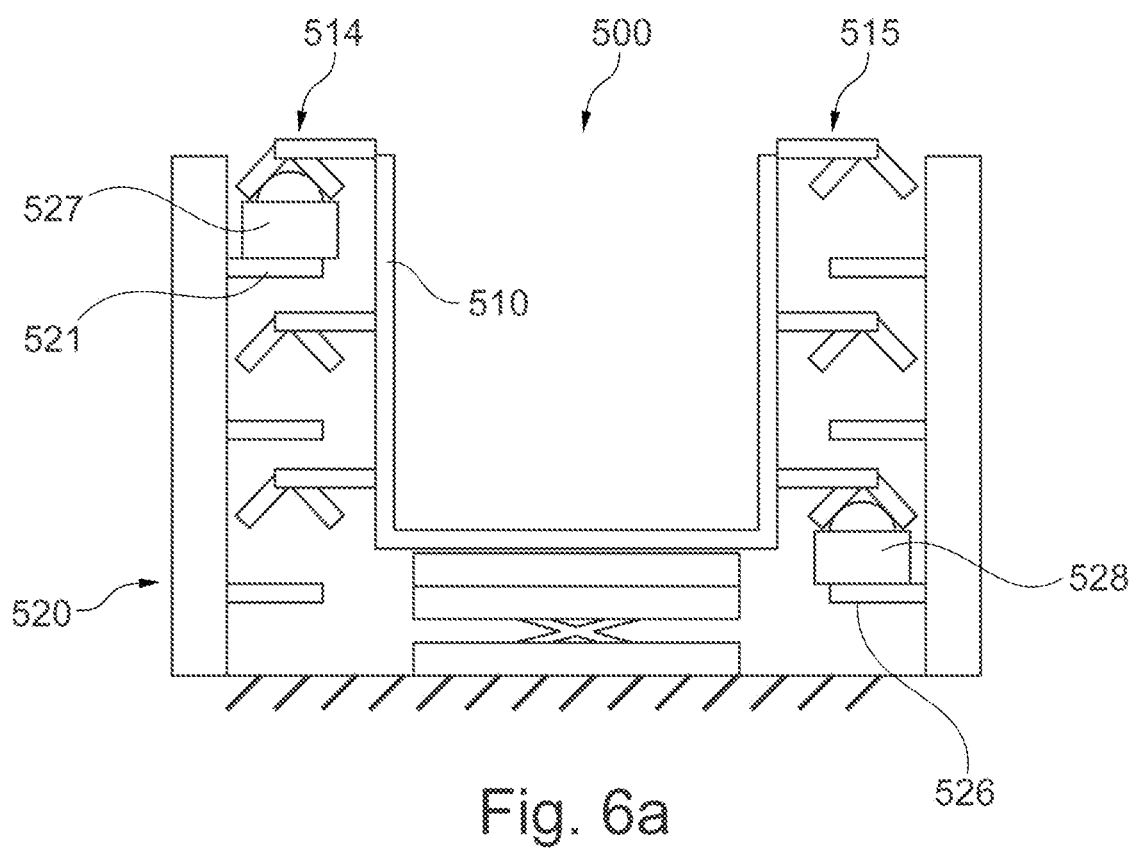
FIGS. 6a and 6b a further embodiment example of a gravity pendulum system.
Figure 6B:
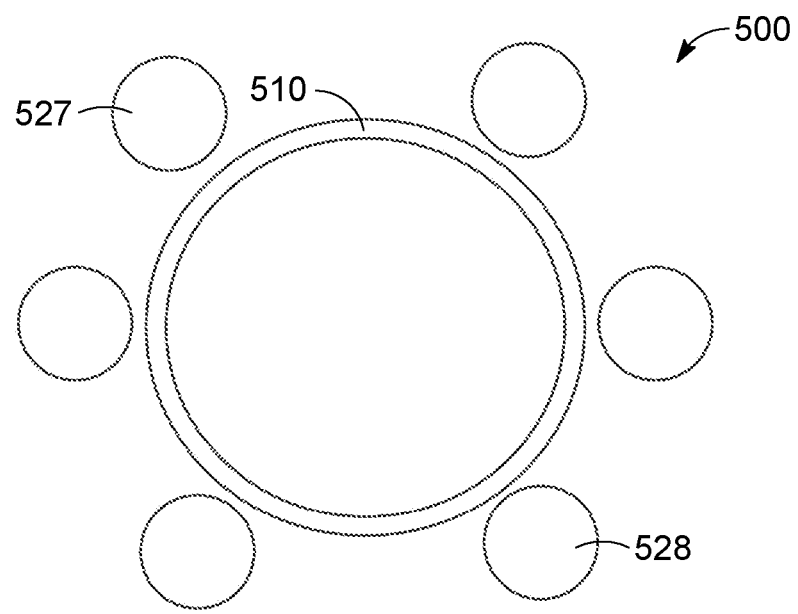

A further embodiment of a gravity pendulum system 500 is represented in FIGS. 6. The adapter 510 thereby comprises contact bodies or connection elements which come into contact with a spherical bearing in a manner such that a spherical bearing 527 and 528 which is arranged on the contact surfaces 521 to 525 defines the pendulum axis 517. In the embodiment example of FIGS. 6, the adapter requires no spherical caps at all but merely receiving devices for connection to spherical caps which are arranged on the holding device 520. In the present case the spherical caps are designed as part of the spherical bearing. This for example can be a bearing stabilised by air or liquid. The different pendulum axes can otherwise be created by different combinations of contact bodies and the spherical bearings 527 and 528, similarly to the preceding embodiment examples, in order thus to determine the total inertia and deviation moments as well as the centre of gravity of the object which is held in the adapter 510. The contact bodies can comprise pins for example, in order to connect the adapter 510 to the spherical bearings 527 and 528 which are arranged on the contact surfaces 521 and 526, wherein the spherical bearings comprise suitable openings for the pins, so that these assume a positive connection to the adapter. Movements of the adapter from now are transmitted onto the spherical bearings without friction and the pendulum procedures can be carried out Further embodiments of gravity pendulums are explained by way of FIGS. 7 and 8, and these permit a pendulation about at least one pendulum axis which does not run horizontally or is vertical. The gravity pendulum which is schematically represented in FIG. 7 comprises an adapter 610, as well as a holder 620 and an object 630 arranged on the adapter 610. The surface of the carrier 611 is aligned horizontally in its idle position. The adapter 610 is connected to the holding device 620 via a pivot. The pivot 621 is thereby arranged such that this in each case is different to the x-axis and y-axis by an angle which is different to $\alpha=0$. The thus defined pendulum axis 617 therefore does not run horizontally. Different pendulum axes can now be set by way of changing the angle $\alpha$ between the adapter 610 and the pivot 621. This is particularly recognisable by way of FIG. 7b, with which the angle $\alpha'$ is significantly different to the angle $\alpha$ of FIG. 7a. Different obliqueness of the pendulum axis can be set for determining the inertia characteristics in this manner. The centre of gravity of the object to be measured should lie below the pendulum axis.

Figure 7A:
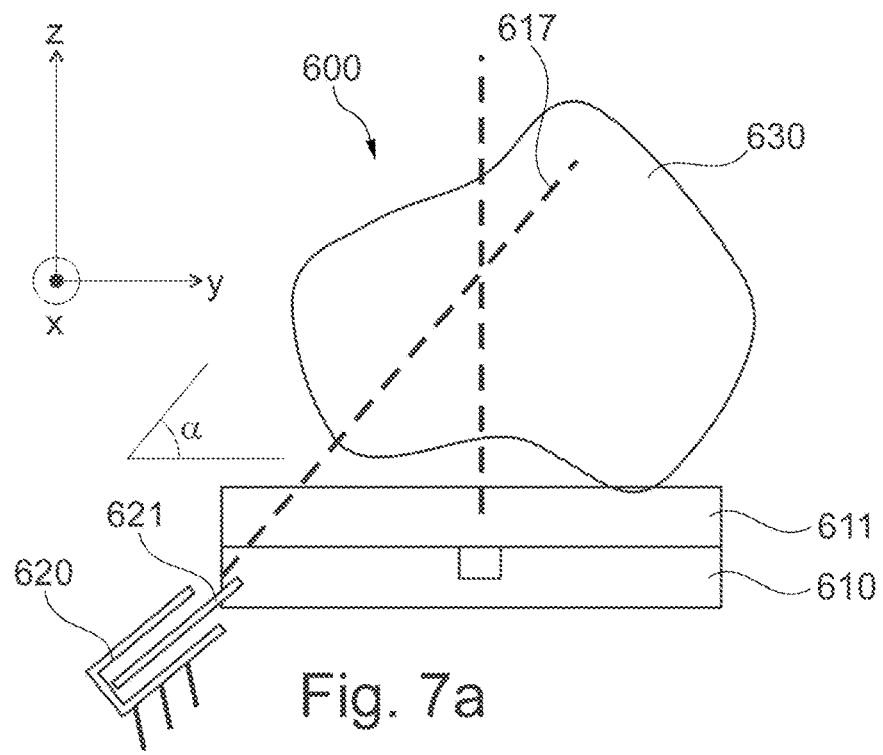
FIGS. 7a to 7f further embodiment examples of a gravity pendulum with a pendulum axis which does not run horizontally.
Figure 7B:
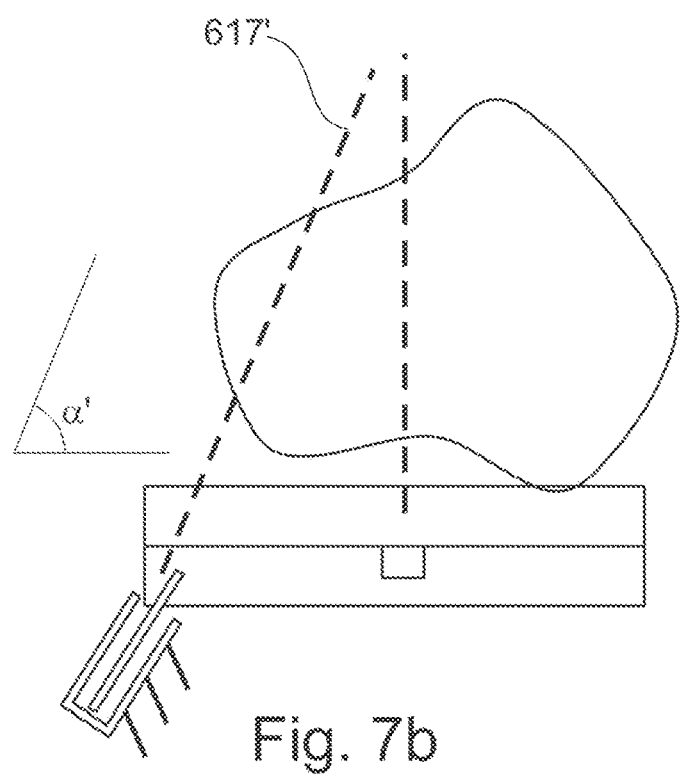
Figure 7C:
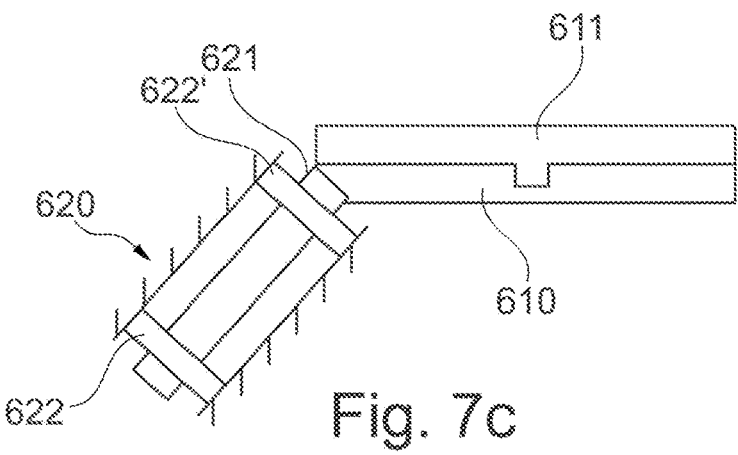
Figure 7D:
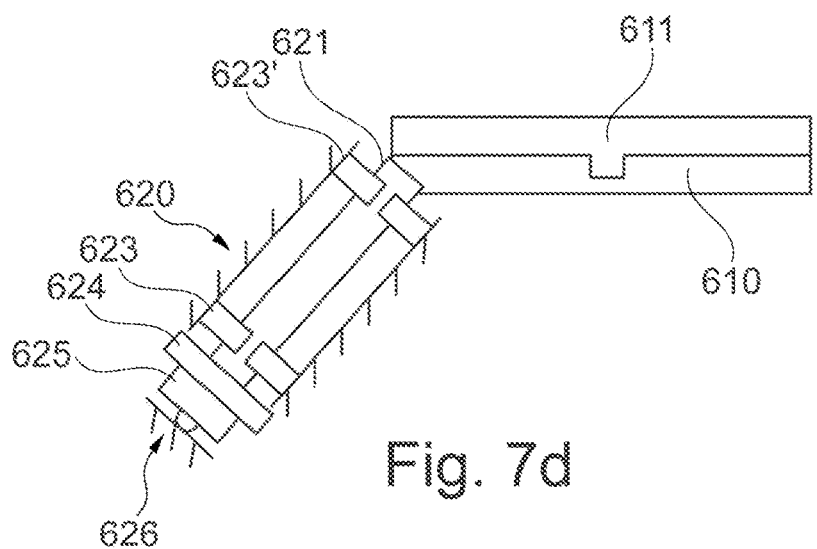

A mounting of the pivot which is connected to the adapter is explained in more detail by way of FIGS. 7c and 7d. A longitudinal section through the holder 620 is shown in FIG. 7c. The pivot 621 which is fastened on the adapter 610 is held in the holder 620. The carrier 611 which is arranged on the adapter 610 is rotatably mounted on the adapter 610 and is not directly connected to the pivot 621. The pivot in the drawn inclination is held by two bearings 622 and 622'. The bearings can thereby be realised as ball bearings in the present case.

A further variant of the mounting is represented in FIG. 7d. Here too, a longitudinal section through a variant of the holder 620 is shown. The pivot 621 is led through two segment air bearings 623 and 623'. A plate 624 which together with the element 625 forms a plane sliding bearing is arranged at an end of the pivot 621 which is away from the adapter 610. The element 625 moreover comprises an angle compensation element which does not move dynamically. The angle compensation element can for example be peg which is held in a sunk bore of the plate 626. The inclination of the plane 626 is rotated by 90° with respect to the inclination of the pivot 621.

As to how a multitude of bearing mechanisms for the pendulum bearing with one axis is possible is merely to be illustrated by way of FIGS. 7c and 7d.

Figure 7E:
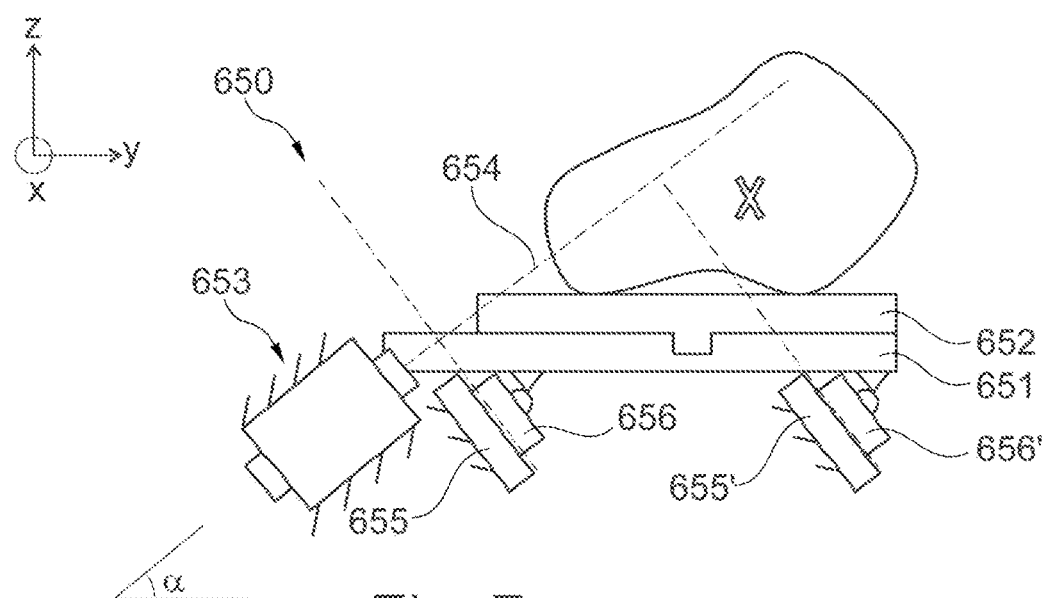

A further variant of a gravity pendulum is represented in FIG. 7e. The gravity pendulum 650 comprises a holder 653 which can be designed for example as in the FIG. 7c or 7d. The pivot which is guided in the holder 653 defines a pendulum axis 654 which is selected such that it runs above a centre of gravity of a test object 660 which is marked at "X".

The gravity pendulum additionally comprises two planes 655 and 655' which are designed as sliding plates, so that no torque acts upon the pivot. Two plane sliding bearings 656 and 656' which are arranged in a manner sliding on the corresponding plane 655 and 655' respectively are located on the lower side of the adapter 651 which is essentially comparable to the adapter 610 of FIGS. 7a-d. Thereby, the inclination of the planes 655 and 655' is selected at a right angle to the inclination of the pendulum axis 654. The carrier 652 for example can be rotated with respect to the adapter 651 and a measurement carried out per position of the carrier after a rotation, in order to measure different inertia components of the test object 660. Thus further components of the inertia tensor or of the centre of gravity can be determined, until this is present to its full extent. The holder 653 and the sliding plates 655 and 655' can be mounted in each case on a bearing block, in order for example to ensure an adjustability of the inclination of the pendulum axis 654. Thereby, the adjustability is carried out by way of a hydraulic, pneumatic or mechanical mechanism. An adjustability of the holder is of course also possible with the variants of FIGS. 7a and 7b, wherein here only the holder needs to be held in a rotatable bearing block.

The sliding bearings 656 and 656' can be designed for example as plane air bearing pads. Thereby, they can be fastened on the adapter 651 by way of a ball joint, so that manufacturing tolerances can be compensated.

It is further recognisable in FIG. 7e, that the bearings 656 and 656' are distanced to one another. In the embodiment example represented in FIG. 7e, two bearings, of which one is covered in the drawing by way of the drawn bearing 656', are located on the sliding plate 655'. By way of this arrangement, it is possible to hold the test object 660 on the adapter 651 in a torque-free manner and to pendulate it about the pendulum axis 654.

Figure 7F:
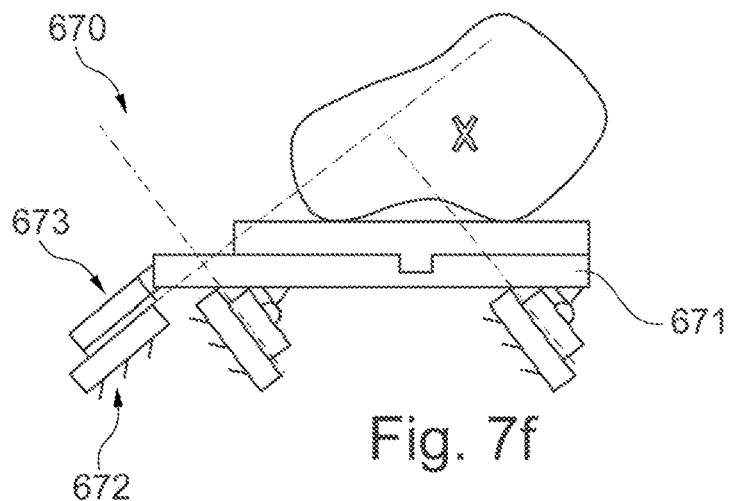

A variant of a gravity pendulum which can be compared to that in FIG. 7e is represented in FIG. 7f. The difference between the gravity pendulum 670 and the gravity pendulum 650 lies in the fact that a blade bearing 673 is envisaged for mounting the adapter 671 on the holder 672.

A further embodiment of a gravity pendulum 700 is represented in the FIG. 8. The gravity pendulum system 700 comprises an adapter 710, which on the one hand is movably arranged on a spherical air bearing 721 and on a plane air bearing 723 which is arranged on a movable (rotatable about the X axis) plane 722. The plane air bearing can freely oscillate on the plane 722 along a circular trajectory, wherein the spherical bearing 721 permits this movement with a low friction. The pendulum axis 717 is determined by the inclination of the plane 722, wherein the angle $\alpha$ is defined between the horizontal and the pendulum axis 717. The plane 722 is at a right angle to the pendulum axis.

Figure 8A:
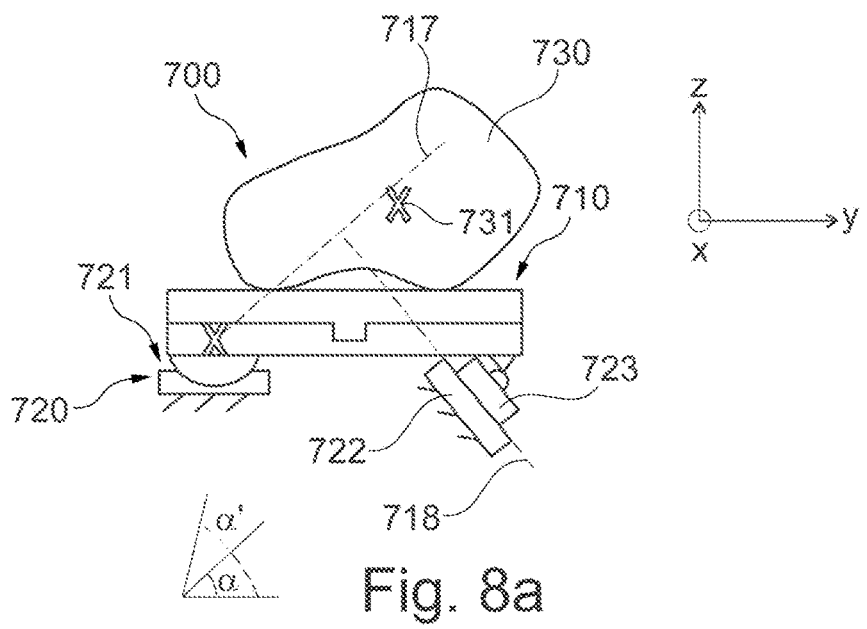
FIGS. 8a and 8b a further embodiment example of a gravity pendulum with a pendulum axis which does not run horizontally.
Figure 8B:
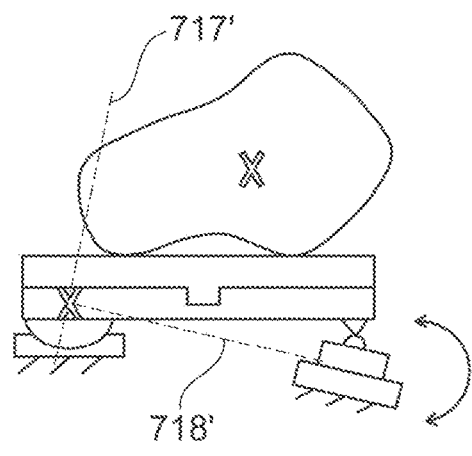

As to how different pendulum axes 717 and 717' can be set is represented in the FIGS. 8a and 8b. The pendulum axis 717' also changes by way of changing the angle of the plane 722, as is represented in FIG. 7b, and this pendulum axis is now at an angle of α' to the horizontal, and perpendicular to the plane 722. A multitude of pendulum axes can be set in this manner by way of different angular settings of the movable plane 722. The object can yet be additionally rotated on the adapter 710, so that several inertia characteristics components can be measured in an angular setting.

With regard to the adapters represented in FIGS. 7 and 8, it is the case of adapters which comprise a pendulum mechanism which is arranged completely below the upper edge of the adapter 710. Objects which are larger than the dimensions of the adapter 710 can be measured in this manner. A smaller measurement system is provided in this manner, with which however large objects can also be measured.

A more detailed embodiment example of a gravity pendulum is to be explained by way of FIG. 9. The gravity pendulum 800 comprises an adapter 810 with a carrier 811 which is rotatably mounted on the adapter. The adapter 810 is hereby a metal construction of hollow carriers which can be recognised in more detail in FIG. 9b, with which the individual components are represented in a semi-transparent manner. The adapter 810 comprises a continuation 812, on which a spherical cap of a spherical bearing is coupled, said bearing being held in the mount 820 in a ball socket. The mount is also a metal frame construction of hollow elements. However, other materials are also possible, such as composite materials such as glass-fibre-reinforced plastics, or similarly stiff materials.

Figure 9A:
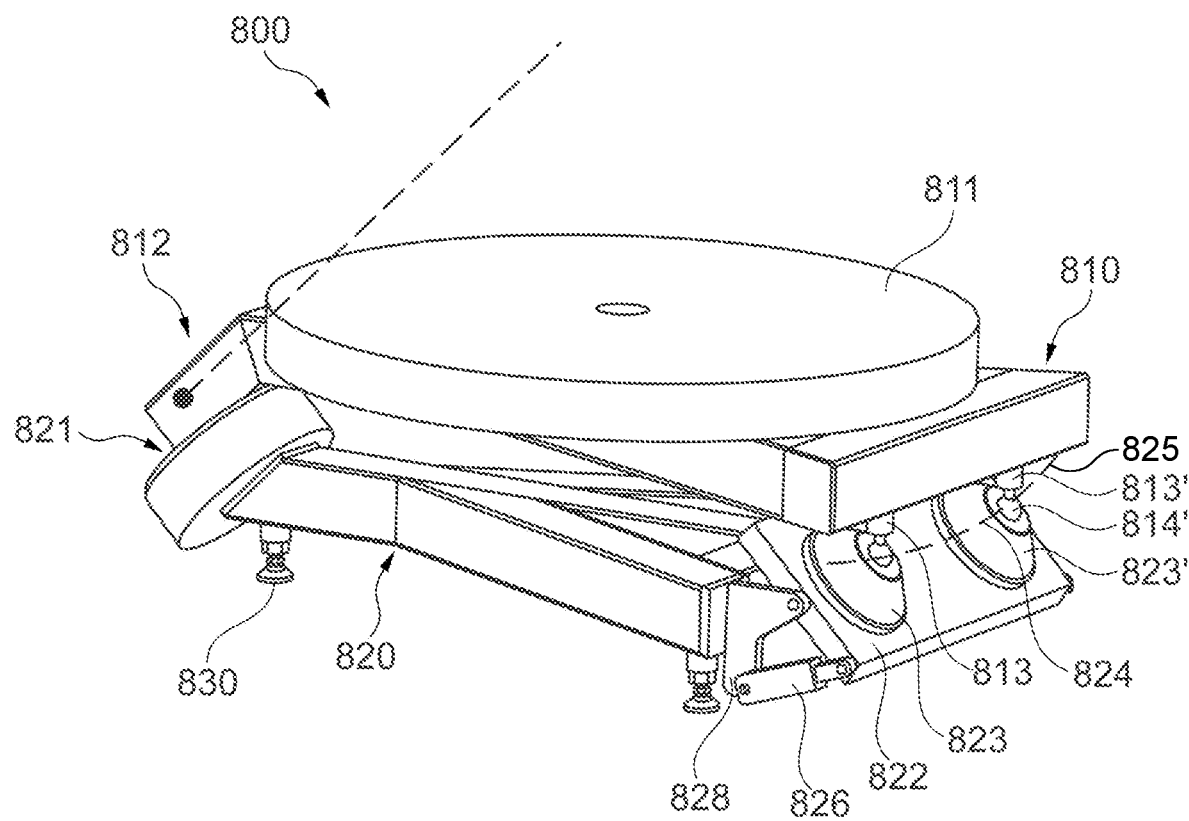
FIGS. 9a to 9d a further embodiment example of a gravity pendulum with a pendulum axis which does not run horizontally.
Figure 9B:
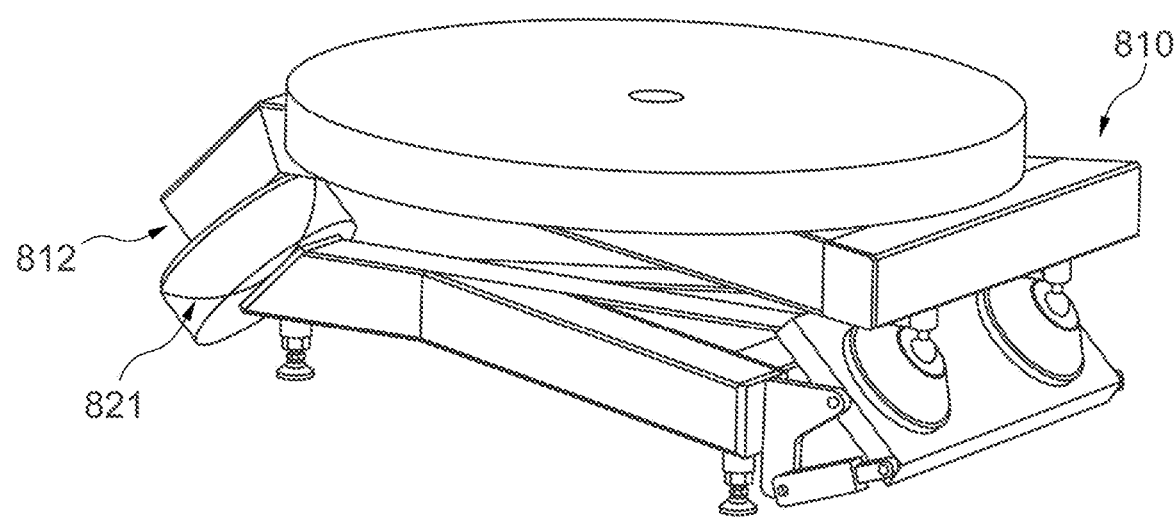

A measurement platform, on which a test object can be arranged, is of particularly significance for the carrier 811 represented in FIG. 9a (as is the case with the other carriers of the FIGS. 7 to 11). It is clearly evident by way of FIG. 9a, that the complete construction of the gravity pendulum is arranged below the measurement platform. The mount 820, apart from the holder 821 which in the present example and in FIG. 9b is more closely recognisable as a ball socket, comprises a sliding plate 822 which is designed in a plane manner. Continuations 813 and 813' with a spherical head 814 and 814' respectively, in which a sliding bearing 823 and 823' respectively is held, are located on the adapter 810. The sliding bearings 823 and 823' can thereby slide on the sliding plate 822. A pendulum axis 824 which is at right angles to the inclination of the sliding plate 822 is defined on account of the set inclination of the sliding plate 822. If now the gravity pendulum or the carrier or the adapter is knocked, then a test object arranged on the carrier 811 pendulates about the pendulum axis 824, so that the sliding bearings 823 execute a pendulum movement following the trajectory 825. The frequency spectrum of the oscillation can be determined by way of suitable evaluation electronics which are not drawn in more detail in this embodiment example. The inertia characteristics of the test object to be measured can then be determined from the frequency measurements. The sliding plate 822 can be rotated about the bearing bock 828 by way of a mechanic linkage 826, in order to change the inclination of the sliding plate 822.

Figure 9C:
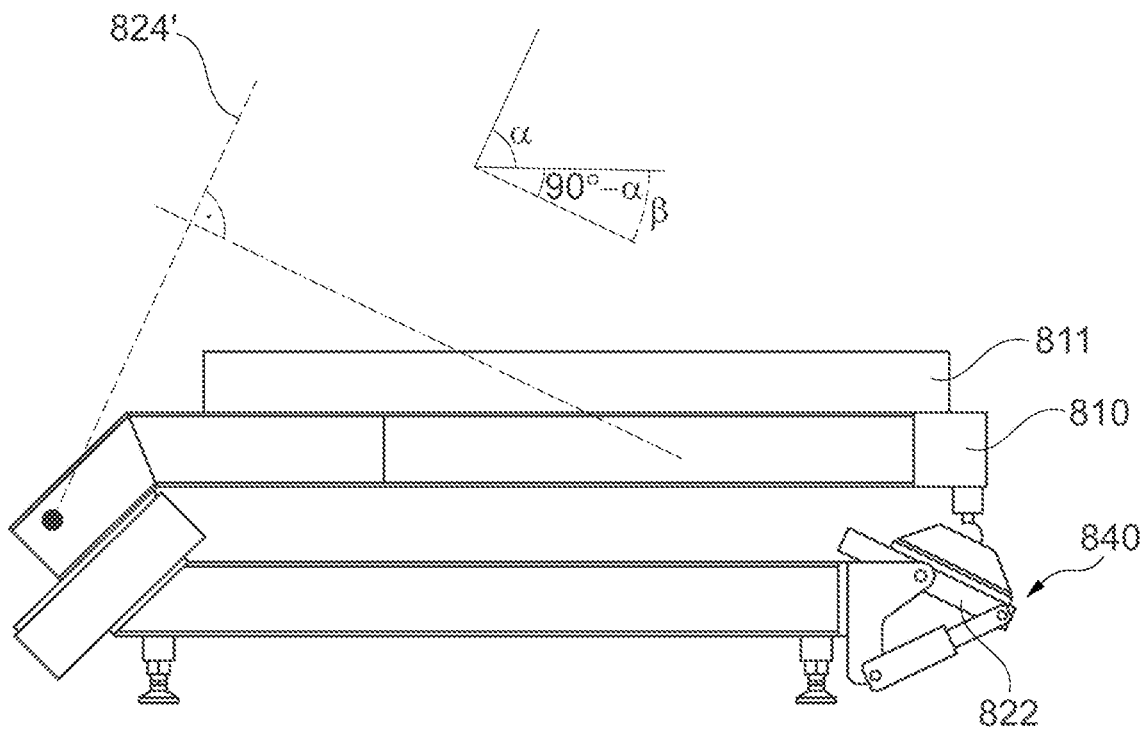
Figure 9D:
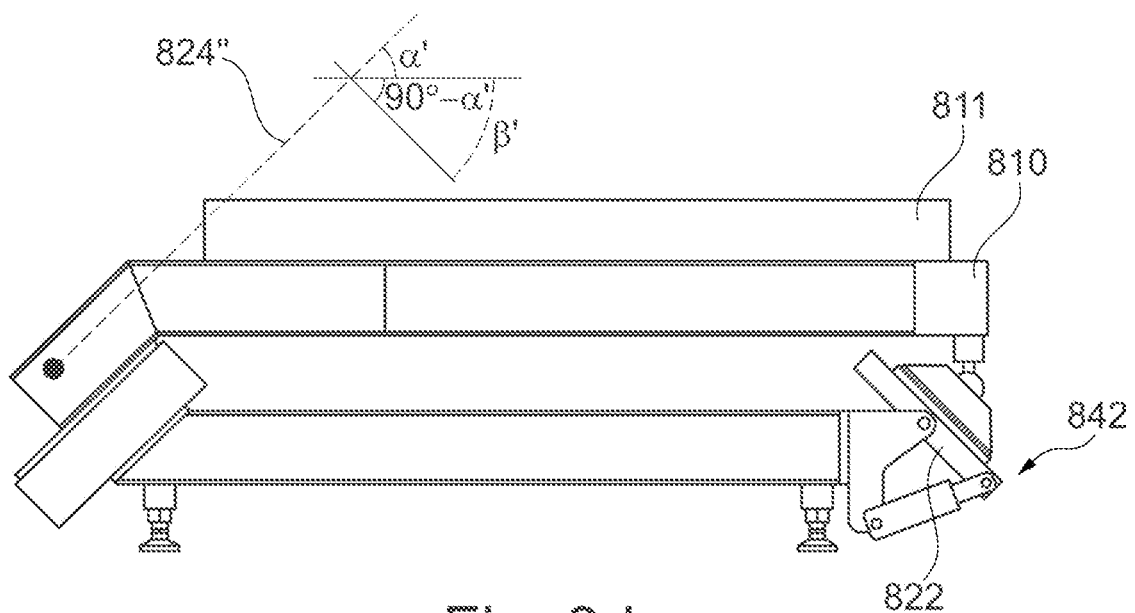

This is explained in more detail by way of FIGS. 9c and 9d. An inclination 840 of the sliding plate 822 is represented in FIG. 9c. The inclination corresponds to the angle β with respect to the horizontal. The adapter 810 now pendulates about the pendulum axis 824', due to the selected inclination 840. If now, a changed inclination 842 of the sliding plate 822 is selected as shown in FIG. 9d, then the pendulum axis 824" changes to the angle α'. Although the adapter 810 is aligned in a horizontal and plane manner in the idle position in both configurations (for example by way of adjusting the feet 830 as is shown in FIG. 9a), the adapter 810 however pendulates about two different pendulum axes 824' and 824".

An embodiment example of a mechanism for adjusting the angle of the plane or sliding plate is put forward by way of the FIG. 10. A detail of a gravity pendulum 900 is represented in FIG. 10a and this comprises an adapter which similarly as in FIG. 9a comprises continuations 913 with balls 914, in which a sliding bearing 923 is held. The sliding plate 922 which can consist of a polished metal for example, is rotatably held in a bearing block 924. The angle setting of the sliding plate 922 can be changed by way of a pneumatic cylinder 926. If the stroke of the cylinder increases, then the inclination of the sliding plate 922 becomes steeper with respect to the horizontal. If the stroke of the cylinder reduces, then the inclination of the sliding plate 922 becomes shallower. A hydraulic cylinder with a hydraulic fluid can of course also used instead of a pneumatic cylinder.

A plan view of the sliding plate and the bearing pads arranged thereon is represented in FIG. 10b. The sliding plate 922 is held in the bearing block 924 or the opposite bearing block 924'. The bearing pads 923 and 923' are arranged on the sliding plate 922 in a sliding manner. The oscillation amplitude of the adapter can be selected small, i.e. in the region of a few centimetres A further embodiment example of a gravity pendulum is to be explained by way of FIG. 11. The gravity pendulum 1000 represented in FIG. 11a comprises an adapter 1010 which comprises a base plate 1012 which for example corresponds to the adapter 810 of the embodiment example of FIG. 9. A carrier 1011 which is designed in a plane manner as a measurement platform in order to receive a test object is located on this base plate. The carrier 1011 is connected to the base plate 1012 via a rotation and displacement mechanism 1014. The carrier 1011 can thereby on the one hand be rotated about the z-axis and on the other hand guided along a guide rail running in the y-direction, on the rotation and displacement mechanism 1014, so that the carrier can be moved in the direction 1016.

An offset in the positive y-direction is represented by way of example in FIG. 11b. It is to be understood that although the pendulum axis does not differ in the FIGS. 11a and 11b, various spatial axes of the test object 1020 can be measured and thus further inertia characteristics of the test object 1020 can be determined by way of a measurement in the configuration of FIG. 11b.

Further embodiments can be deduced by the man skilled in the art from the disclosures made here. The state of the art is referred to concerning a method for determining the inertia or deviation moments from the measurements carried out with the gravity pendulum. Amongst other things, the application comprises the following aspects:

1. An adapter for a gravity pendulum, wherein the adapter comprises a carrier for fastening a gravity body to be measured, and at least two contact bodies which are arranged on the carrier, wherein the at least two contact bodies comprise ellipsoidal caps, preferably spherical caps.

2. An adapter according to one of the preceding aspects, wherein at least three contact bodies are present, which are arranged in a manner such that these do not lie on a straight line.

3. An adapter according to one of the preceding aspects, wherein the carrier comprises a lateral surface and the at least two contact bodies are arranged on the lateral surface.

4. An adapter according to aspect 3, wherein a multitude of contact bodies are arranged on a lateral outer surface of the lateral surface such that at least two contact bodies lie on a straight line running through a carrier volume delimited by the lateral surface.

5. An adapter according to one of the preceding aspects, wherein the carrier comprises a device for fixing the gravity body to be measured, so that the gravity body can be held in a spatially fixed manner in a carrier coordinate system.

6. An adapter according to one of the preceding aspects, wherein the adapter in one working configuration comprises no moving parts.

7. An adapter for a gravity pendulum, wherein the adapter comprises a carrier for fastening a gravity body to be measured, and at least two contact bodies which are arranged on the carrier, wherein the at least two contact bodies comprise receiving devices for receiving ellipsoidal caps.

8. An adapter for a gravity pendulum, wherein the adapter comprises a carrier for fastening a gravity body to be measured and at least two contact bodies arranged on the carrier, wherein the contact bodies comprise a polyhedron section or cone section, which tapers in a pointed manner, wherein a tip of the polyhedron section or cone section forms a contact point.

9. A gravity pendulum holder for an adapter according to one of the preceding aspects, wherein the gravity pendulum holder comprises a holding carrier and at least two contact surfaces,
wherein a wedge-like recess is present between the two contact surfaces.

10. A gravity pendulum comprising a holder and an adapter, wherein
the holder comprises a holding carrier and at least two contact surfaces,
the adapter comprises at least one carrier for fastening a gravity body to be measured, and at least two contact bodies arranged on the carrier,
wherein the contact surfaces or the contact bodies comprise ellipsoidal caps.

11. A gravity pendulum according to aspect 10, wherein the two contact surfaces are arranged at a different height relative to the holding carrier.

12. A gravity pendulum according to one of the aspects 10 to 11, wherein the two contact surfaces lie opposite one another at the same height in a manner such that the adapter is held between the contact surfaces.

13. A gravity pendulum according to one of the aspects 10 to 12, wherein the ellipsoidal caps are each designed as part of a spherical bearing.

The invention claimed is:

1. A gravity pendulum comprising:
a pivot device defining a pendulum axis; and
an adapter coupled to the pivot device at a pivot location, the adapter comprising at least one carrier for supporting an object to be measured, wherein the pivot location is below a surface of the carrier,
wherein the pivot device is connected to the adapter in a manner such that the adapter can be pendulated about the pendulum axis, and
wherein the adapter is configured to be pendulated about at least one pendulum axis which does not run horizontally.

2. The gravity pendulum according to claim 1, wherein an inclination of the pendulum axis is adjustable.

3. The gravity pendulum according to claim 1, wherein the pendulum axis is configured to be set in a manner such that a center of gravity of the object to be measured lies below the pendulum axis.

4. The gravity pendulum according to claim 1, further comprising:
a holder configured to hold the pivot device, wherein the adapter is connected to the holder via a spherical bearing.

5. The gravity pendulum according to claim 1, further comprising at least one bearing coupled to the pivot device.

6. The gravity pendulum according to claim 1, further comprising:
a mount configured to support the adapter;
at least one sliding bearing coupled to the adapter; and
at least one sliding plate coupled to the mount and positioned below the adapter, the at least one sliding plate configured to support the at least one sliding bearing, the at least one sliding plate rotatable about a spatial axis that is perpendicular to the pendulum axis.

7. The gravity pendulum according to claim 6, wherein an angular setting of the plane is configured such that different angle settings define different pendulum axes.

8. The gravity pendulum according to claim 7, wherein the plane comprises a sliding plate capable of being rotated about the spatial axis and/or the angular setting is capable of being adjusted mechanically, hydraulically, or pneumatically.

9. The gravity pendulum according to claim 1, wherein the carrier is arranged in a manner which is rotatable and/or displaceable with respect to the adapter, so that an object to be measured is capable of being rotated on the adapter.

10. The gravity pendulum according to claim 1, further comprising:
a mount on which the adapter is pendulated.

11. A method for determining a moment of inertia by way of a gravity pendulum with a pivot device defining a pendulum axis and an adapter coupled to the pivot device at a pivot location, the adapter comprising at least one carrier for supporting an object to be measured, wherein the pivot location is below a surface of the carrier, the method comprising:
successively pendulating the adapter about at least two pendulum axes which do not run parallel;
performing at least one measurement; and
determining the moment of inertia using the at least one measurement.

12. The gravity pendulum according to claim 1, wherein the adapter is connected to the holder via a spherical air bearing.

13. A gravity pendulum comprising:
a pivot device defining a pendulum axis, the pivot device including a spherical bearing; and
an adapter coupled to the pivot device at a pivot location, the adapter comprising at least one carrier for supporting an object to be measured, wherein the pivot location is configured to be located below a center of gravity of the object to be measured,
wherein the pivot device is connected to the adapter in a manner such that the adapter can be pendulated about the pendulum axis, and
wherein the adapter is configured to be pendulated about at least one pendulum axis which does not run horizontally.

* * * * *